(12) United States Patent
Oka et al.

(10) Patent No.: US 6,879,395 B2
(45) Date of Patent: Apr. 12, 2005

(54) SPECTRUM MEASURING INSTRUMENT

(75) Inventors: Kouichi Oka, Otsu (JP); Makoto Okawauchi, Shiga (JP)

(73) Assignee: Otsuka Electronics Co., Ltd., Hirakata (JP)

( * ) Notice: Subject to any disclaimer, the term of this patent is extended or adjusted under 35 U.S.C. 154(b) by 129 days.

(21) Appl. No.: 10/311,994

(22) PCT Filed: Jun. 19, 2001

(86) PCT No.: PCT/JP01/05199

§ 371 (c)(1),
(2), (4) Date: Dec. 23, 2002

(87) PCT Pub. No.: WO01/98740

PCT Pub. Date: Dec. 27, 2001

(65) Prior Publication Data

US 2003/0107733 A1 Jun. 12, 2003

(30) Foreign Application Priority Data

Jun. 21, 2000 (JP) .................................. 2000-186514

(51) Int. Cl.[7] .................................................. G01J 3/28
(52) U.S. Cl. ........................ 356/326; 356/328; 356/307
(58) Field of Search ............................... 356/326, 328, 356/334, 307; 250/227.18, 227.23, 227.32

(56) References Cited

U.S. PATENT DOCUMENTS 4,715,712 A * 12/1987 Nogami ...................... 356/328
5,128,549 A * 7/1992 Kaye .......................... 250/372

FOREIGN PATENT DOCUMENTS

| EP | 0 167 750 A2 | 1/1986 | |
|----|--------------|--------|---|
| EP | 0 449 442 A1 | 10/1991 | |
| EP | 0 652 423 A1 | 5/1995 | |
| JP | 54-132973 | * 10/1979 | ............. G01J/3/36 |

OTHER PUBLICATIONS

Shigeru, S. et al., "Multiwavelength Spectrophotometer," Patent Abstracts of Japan, Japanese Patent Publication No. 56–057925, May 20, 1981, (1 sheet).
Makoto, W., "Multiple Wavelength Spectroscope Device," Patent Abstracts of Japan, Japanese Patent Publication No. 58–178227, Oct. 19, 1983, (1 sheet).

* cited by examiner

*Primary Examiner*—Layla Lauchman
(74) *Attorney, Agent, or Firm*—Finnegan, Henderson, Farabow, Garrett & Dunner L.L.P.

(57) ABSTRACT

In a spectrum measuring instrument of the present invention, a detecting surface of a detector is a two-dimensional detecting surface and spectrum light coming out from a dispersing element and is irradiated to a region A on the detecting surface. Signal intensity at the regions on the detecting surface other than the region A where the spectrum light is irradiated, is subtracted from signal intensity on the region A. Consequently, it is possible to obtain an accurate spectrum intensity signal by processing a detection signal in such a manner that adverse effects of stray light generated inside the spectrum measuring instrument and unwanted light generated by reflection and diffraction occurring on the surface of a detecting element are removed.

4 Claims, 7 Drawing Sheets

SPECTRUM MEASURING INSTRUMENT

CROSS REFERENCE TO RELATED APPLICATIONS

This application is a national phase based on international application number PCT/JP01/05199, filed on Jun. 19, 2001, the content of which is incorporated by reference herein, and claims the priority of Japanese Patent Application No. 2000-186514, filed on Jun. 21, 2000.

BACKGROUND OF THE INVENTION

1. Field of the Invention

The present invention relates to a spectrum measuring instrument including a dispersing element and a detector for detecting spectrum light coming out from the dispersing element.

2. Description of Related Art

In spectrophotometry, a dark spectrum without any light irradiation is measured prior to the actual measurement. Thus, a net spectrum is found by subtracting a detection signal of the dark spectrum from a spectrum actually measured by irradiating light to a sample.

However, measuring the dark spectrum alone can only compensate an offset signal of the detector.

During the light irradiation state, light other than the one subject to measurement is also incident on a detecting element under the influence of irregular reflection occurring inside the housing of the spectrum measuring instrument, diffuse-reflection occurring on the surface of the diffraction grating, light in the orders other than the measuring order, etc., which causes a stray light noise that changes the level of the entire signal of a spectrum of transmission light.

In order to remove adverse effects of such unwanted light, the internal of the housing of the spectrum measuring instrument is painted black, a masking slit is provided around the measuring light traveling path, etc. However not all the stray light in the order of $10^{-3}$ or less in the intensity ratio can be removed by these methods.

Also, the surface of the detecting element is generally covered with a light transmitting window to protect the element. Hence, regularly reflected light from the surface of the detecting element strikes the inner surface of the light transmitting window, and reaches the detecting element again, thereby deteriorating the measurement accuracy of the spectrum of transmission light. In particular, because the surface of the detecting element has a periodic structure, diffracted light toward one specific direction becomes stronger than the rest. This diffracted light also strikes the inner surface of the light transmitting window, and reaches the detecting element again, thereby deteriorating the measurement accuracy of the spectrum of transmission light.

The present invention, therefore, has an object to provide a spectrum measuring instrument capable of removing adverse effects of unwanted light generated inside the spectrum measuring instrument by processing a detection signal from a detecting element.

The present invention has another object to provide a spectrum measuring instrument capable of removing adverse effects of unwanted light generated by reflection and diffraction occurring on the surface of the detecting element by processing the detection signal.

SUMMARY OF THE INVENTION

A first aspect of the present invention provides a spectrum measuring instrument characterized in that: a detector has a two-dimensional detecting surface; spectrum light coming out from a dispersing element is irradiated to a portion on the detecting surface; and a signal processing unit is provided for use in obtaining a spectrum signal excluding adverse effects of the likes of stray light by subtracting signal intensity at portions on the detecting surface other than the portion where the spectrum light is irradiated from signal intensity on that portion.

The likes of stray light generated inside the spectrum measuring instrument is incident on the detecting surface as a background in a relatively homogeneous manner. Hence, according to the above arrangement, by performing subtraction, it is possible to obtain a spectrum signal excluding adverse effects of the likes of stray light.

Thus, according to the spectrum measuring instrument of the present invention, adverse effects of the stray light generated inside the spectrum measuring instrument and unwanted light generated by reflection and diffraction occurring on the surface of the detecting element can be removed by processing a detection signal, thereby making it possible to obtain an accurate spectrum intensity signal. The present invention is particularly effective when measuring a sample having a broad range of spectrum intensity.

According to a second aspect of the invention, in case that the detecting surface is provided with a light transmitting window, it is preferable that the spectrum light is irradiated to the detecting surface diagonally or obliquely. This is because the oblique incidence can avoid adverse effects of regular reflection occurring between the detecting surface and light transmitting window. In this case, adverse effects of unwanted light incident on the detecting surface due to diffraction and reflection can be removed through the subtraction of the signal intensity performed by the signal processing unit.

According to a third aspect of the invention, it is preferable that the portion on the detecting surface where the spectrum light is irradiated is an elongate rectangle. This is because spectrum light coming out from the dispersing element is generally a one-dimensional spectrum, and for the structural reason of the dispersing element, the spectrum light, when irradiated, is shaped into an elongate rectangle.

According to a fourth aspect of the invention, in case that the detecting surface is provided with a light transmitting window, it is preferable that the spectrum light is irradiated to the detecting surface diagonally or obliquely. In this case, as shown in FIG. 8, an angle of incidence is defined as an angle a with respect to a normal line z set upright on the detecting surface 13a, in a plane y-z defined by the normal line z and a direction y intersecting at right angles with a direction x along which the one-dimensional spectrum extends.

This oblique incidence can avoid adverse effects of regular reflection occurring between the detecting surface and light transmitting window. In this case, adverse effects of unwanted light having directivity and incident on the detecting surface due to diffraction and reflection can be removed through the subtraction of the signal intensity performed by the signal processing unit.

According to a fifth aspect of the invention, the portions on the detecting surface used in obtaining the signal intensity for subtraction may be located at an outside of a length of the rectangle. This is because, with the signal intensity on anywhere at the outside of the length of the rectangle, it is possible to remove adverse effects of unwanted light having directivity through the subtraction of the signal intensity performed by the signal processing unit.

According to a sixth aspect of the invention, the portions on the detecting surface used in obtaining the signal intensity for subtraction may be also located at an outside of a length and a width of the rectangle.

The following description will describe embodiments of the present invention in detail with reference to the accompanying drawing.

BRIEF DESCRIPTION OF THE DRAWINGS

FIG. 8 is a view explaining an angle of incidence when spectrum light is irradiated obliquely with respect to the detecting surface 13a.

DETAILED DESCRIPTION OF THE PREFERRED EMBODIMENTS

Figure 1:
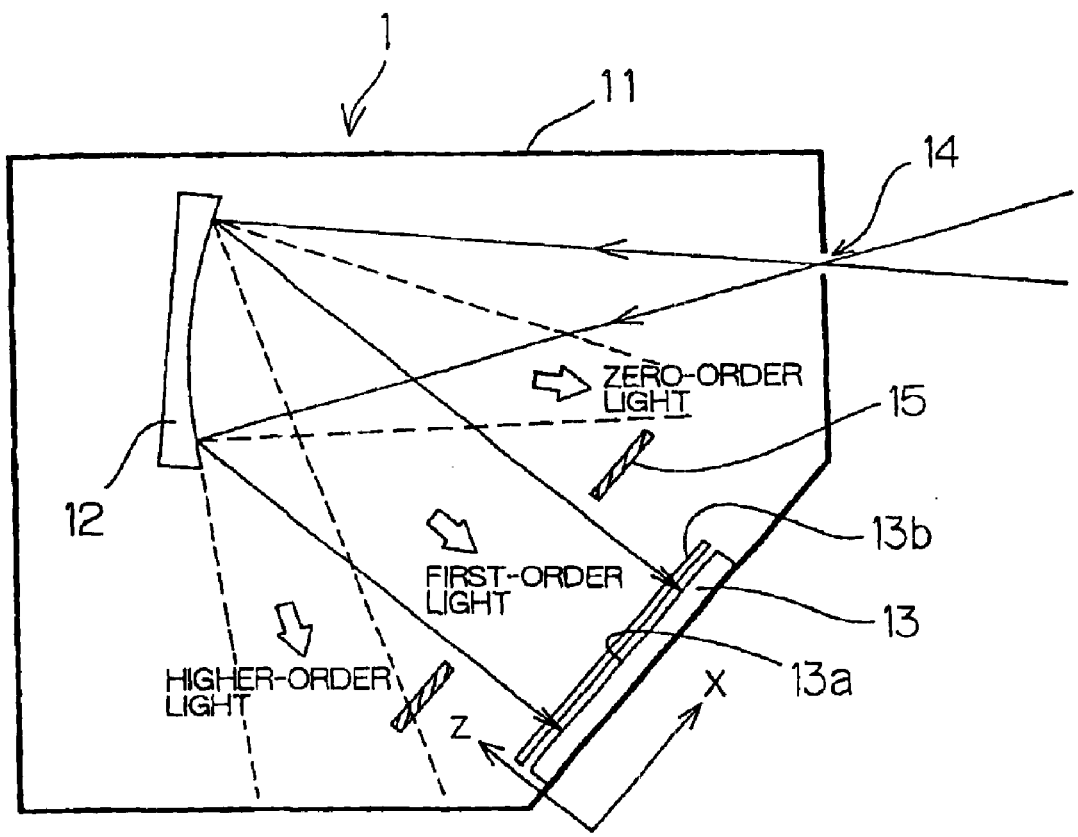
FIG. 1 is a plan view showing an arrangement of an interior of a spectrum measuring instrument 1.

FIG. 1 is a plan view showing an arrangement of the interior of a spectrum measuring instrument 1. The spectrum measuring instrument 1 includes a housing 11 having a black inner surface, a concave diffraction grating 12 provided in the housing 11, and a CCD detector 13. A detecting surface 13a of the CCD detector 13 is covered with a light transmitting window 13b. Also, a hole slit 14 is provided through the wall of the housing 11 to introduce white light (hereinafter, referred to as the measuring light) subject to spectrum measurement. Numeral 15 denotes a light shielding plate for limiting incident light on the CCD detector 13.

Figure 2:
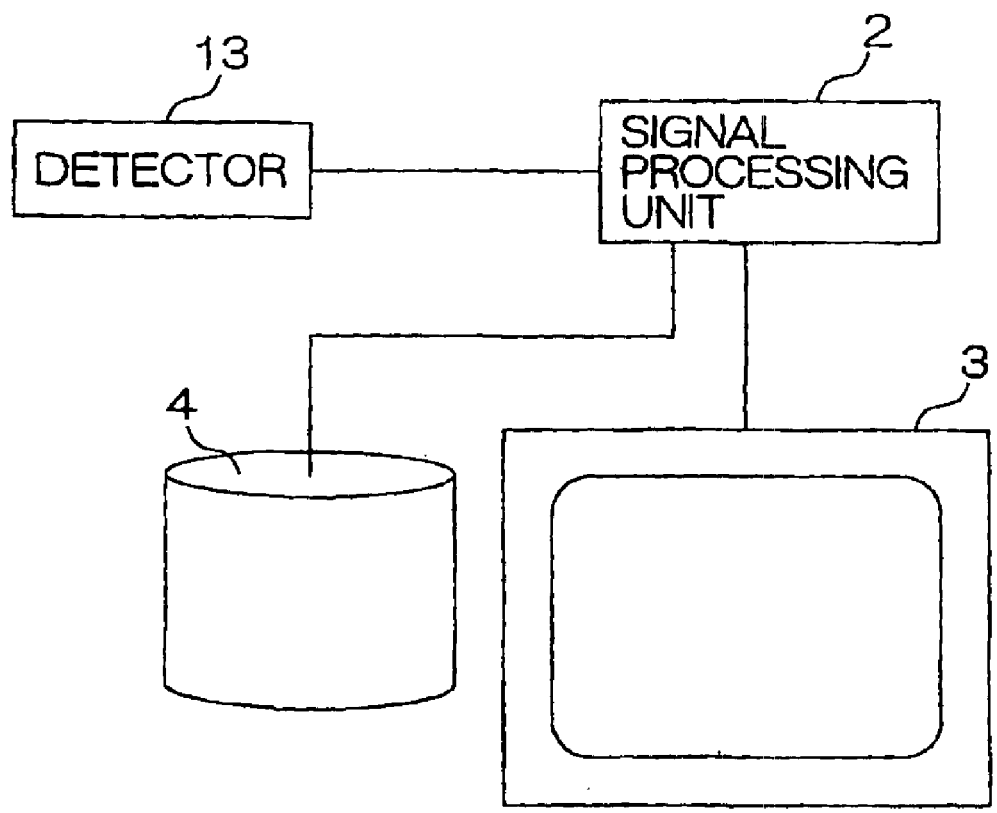
FIG. 2 is a functional block diagram of a signal processing unit and the like of the spectrum measuring instrument 1.

FIG. 2 is a functional block diagram of a signal processing unit and the like of the spectrum measuring instrument 1. A detection signal from the CCD detector 13 is inputted into a signal processing unit 2 composed of a personal computer or the like. The signal processing unit 2 computes net spectrum intensity excluding adverse effects of stray light and the like. The process and result of the computation are stored in a storage unit 4 and displayed on a display unit 3 from time to time.

With reference to FIG. 1, the measuring light having passed through the slit 14 is irradiated to the concave diffraction grating 12, from which zero-order light, first-order light, second- or higher-order light are reflected and diffracted. It is arranged in such a manner that, of all the light in their respective orders, only the first-order light reaches the CCD detector 13, and the light in the other orders including the zero-order light, second- or higher-order light is blocked by the light shielding plate 15 and absorbed into the inner wall of the housing 11. In practice, however, not all the light in the other orders is absorbed, and a part of unabsorbed light strikes the concave diffraction grating 12, and is incident on the CCD detector 13 as stray light by diffuse-reflection and irregular reflection occurring on the surface of the diffraction grating 12. Also, the measuring light itself having passed through the slit 14 is incident on the CCD detector 13 by diffuse-reflection and irregular reflection (but not by diffraction) occurring on the surface of the diffraction grating 12, and this incident light can be also considered as stray light.

In the present invention, light incident on the CCD detector 13 as the stray light is assumed to be distributed over a broad region on the detecting surface 13a of the CCD detector 13.

Figure 3:
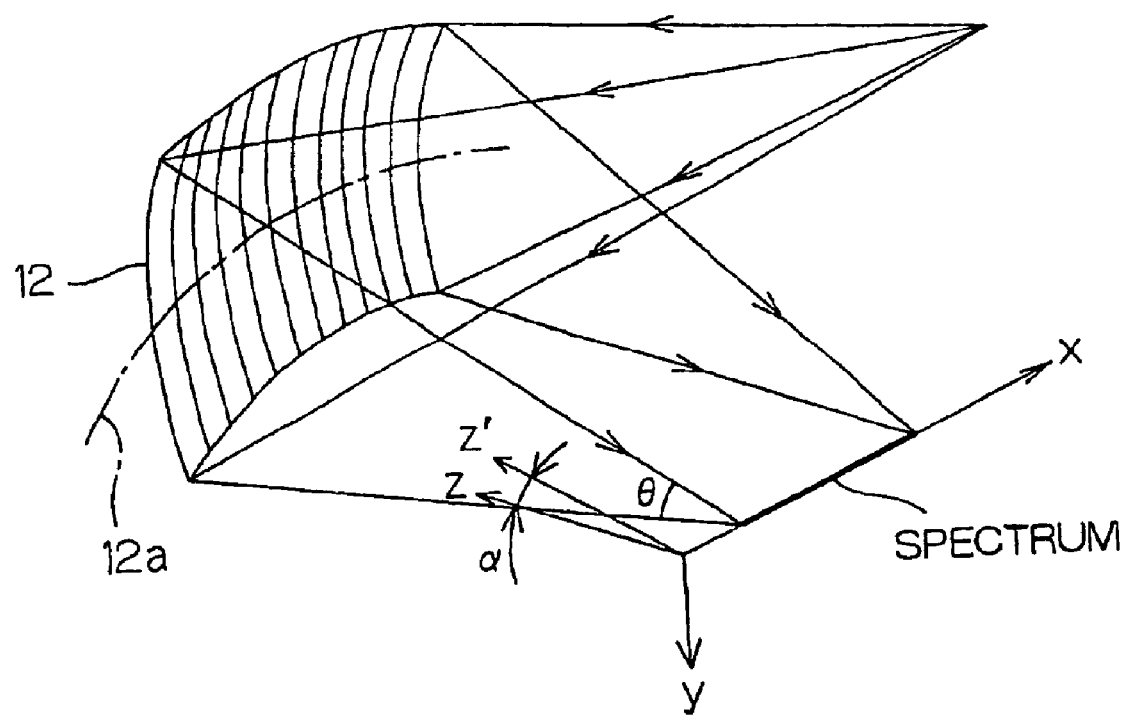
FIG. 3 is a perspective view explaining behaviors of diffracted light from a concave diffraction grating 12.

FIG. 3 is a perspective view explaining behaviors of diffracted light from the concave diffraction grating 12. The concave diffraction grating 12 is a type referred to as a flat focus type, and forms an image of light irradiated from a given point as a one-dimensional spectrum. Herein, a direction x is given as a direction of the one-dimensional spectrum, and a direction z' as a direction extending toward the center 12a of the concave diffraction grating 12. Also, a direction z is given as a direction of the normal of the detecting surface 13a, and a direction y as a direction that intersects at right angles with the directions x and z. The direction z' is titled by a constant angle a with respect to the direction z.

Figure 4:
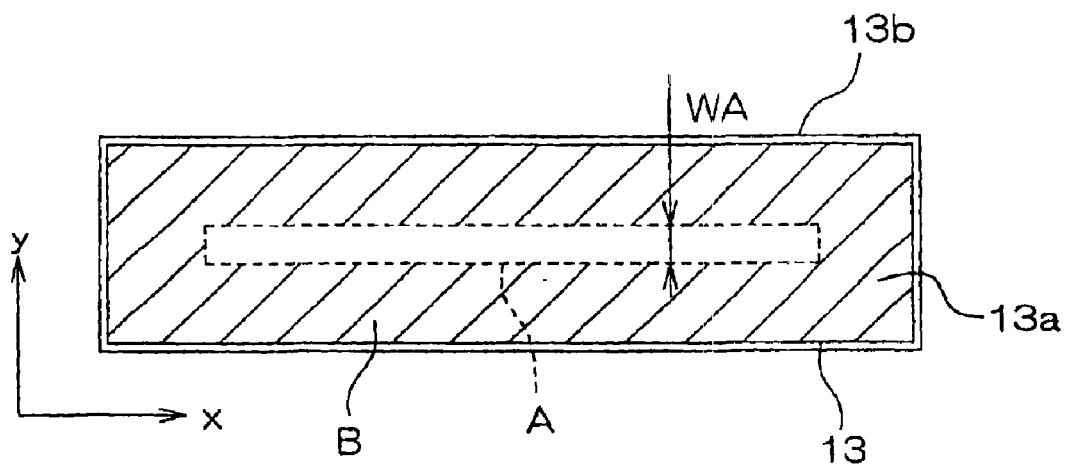
FIG. 4 is a front view showing a CCD detector 13.
Figure 5:
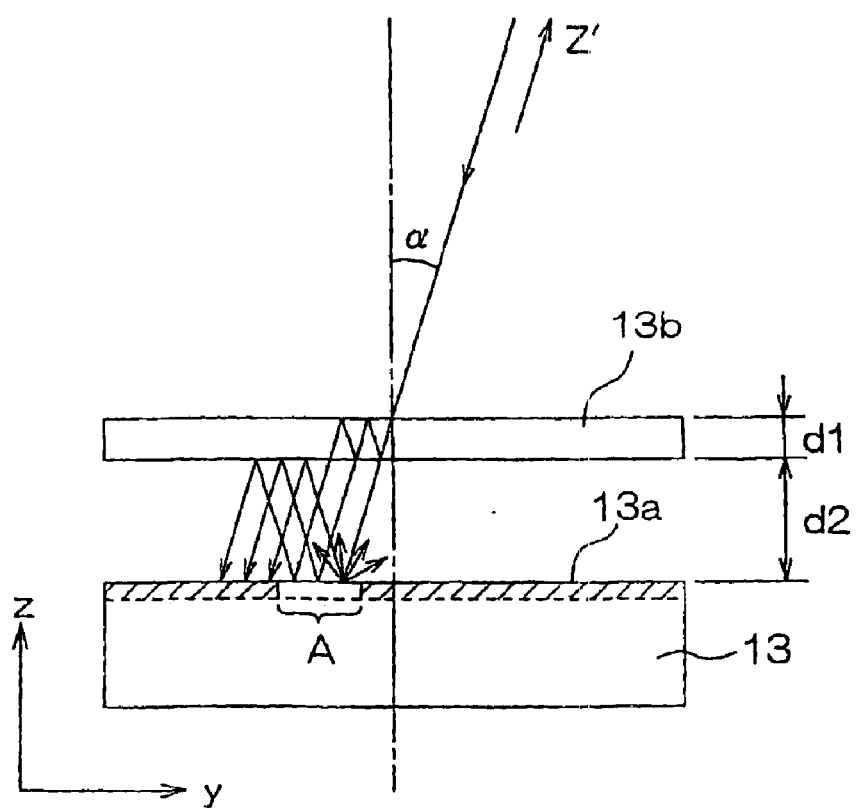
FIG. 5 is a sectional side elevation of the CCD detector 13.

FIG. 4 is a front view of the CCD detector 13, and FIG. 5 is a sectional side elevation of the same. In FIG. 4, the detecting surface 13a of the CCD detector 13 expands on an two-dimensional x-y plane.

Light from the concave diffraction grating 12 is incident on the CCD detector 13 in the z' direction, which is, as previously mentioned, tilted by the angle a with respect to the normal direction z of the detecting surface 13a. Hence, as shown in FIG. 5, the incident light reaches the detecting surface 13a obliquely. A part of the incident light passes through the light transmitting window 13b directly, and reaches the detecting surface 13a. This light is referred to the direct light, hereinafter. A part of the remaining light passes through the light transmitting window 13b while it repeats reflections within the light transmitting window 13b, and reaches the detecting surface 13a.

The light (including the direct light) having reached the detecting surface 13a is reflected regularly, diffracted, or reflected irregularly from the detecting surface 13a, strikes the inner surface of the light transmitting window 13b, and reaches the detecting surface 13a again. The light is diffracted because the detecting surface 13a has a periodic structure (pixel array) in a particular direction. The light that strikes the inner surface of the light transmitting window 13b and reaches the detecting surface 13a again is referred to as the second incident light.

In FIG. 5, the second incident light is illustrated so that it can be distinguished from the direct light on the detecting surface 13a. In practice, however, the second incident light is assumed to be distributed over a broad region including a light receiving region of the direct light for the two following reasons (1) and (2):

(1) because not only regular reflection, but also diffraction occurs on the detecting surface 13a, plus irregular reflection occurs on the detecting surface 13a and the inner surface of the light transmitting window 13b; and (2) because, as shown in FIG. 3, an angle of incidence of the light from the concave diffraction grating 12 falls within a constant angle θ when seen in the y-z plane.

Hence, the direct light is the light that reproduces the spectrum most exactly, and it is proper to treat the second incident light as a noise as is with the stray light.

In FIG. 4, a portion denoted by a capital letter A encircled by a broken line is a region on the detecting surface 13a where the direct light strikes. The rest of the shaded portion denoted by a capital letter B is a region where the intensity of the stray light and second incident light (hereinafter, referred to collectively as the likes of stray light) is measured.

To be more specific in terms of numerical values, for example, the size of each detecting element (pixel) is 25 μm×25 μm. The detecting surface 13a has 1024×128 pixels, and the width WA of the region A encircled by the broken line is 20-pixel wide. Also, a thickness d1 of the light transmitting window 13b is 0.6 mm and a distance d2 between the light transmitting window 13b and detecting surface 13a is 2.3 mm.

Figure 6:
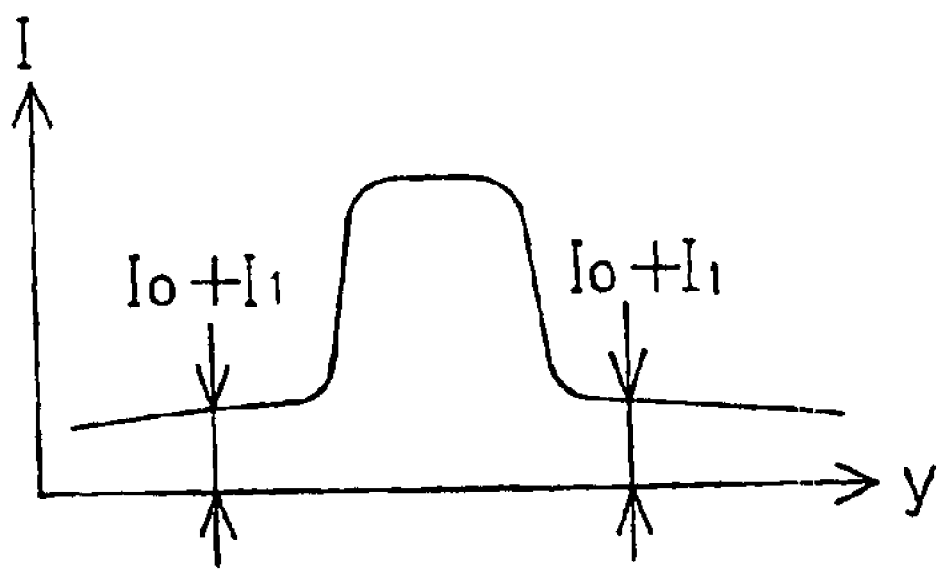
FIG. 6 is a graph plotting detection intensity I on a detecting surface 13a of the CCD detector 13 along a y direction.

FIG. 6 is a graph plotting the detection intensity I on the detecting surface 13a of the CCD detector 13 along the y direction. The peak of the graph represents the intensity of the measuring spectrum of the direct light. The intensity $I_0$ of stray light and the intensity $I_1$ of the second incident light are observed across the detecting surface 13a.

Figure 7:
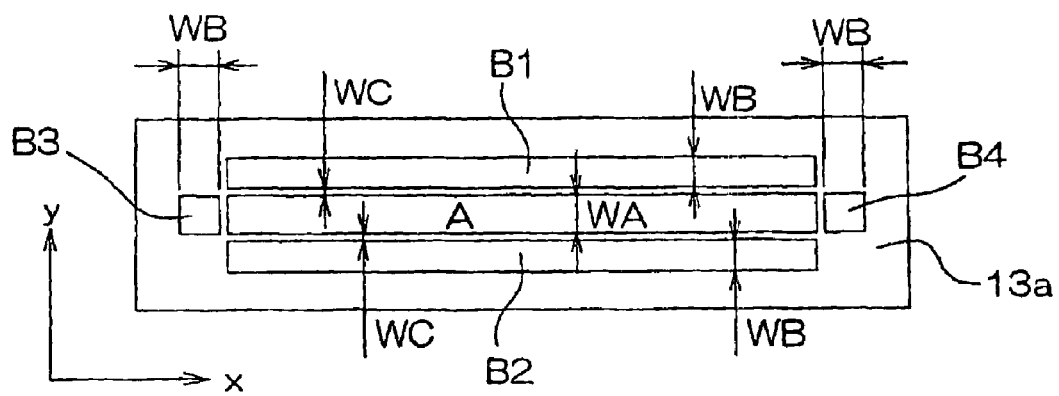
FIG. 7 is a front view showing an example pattern when the detecting surface 13a of the CCD detector 13 is divided into a light receiving region A for direct light and a light receiving region B for the likes of stray light.
Figure 8:
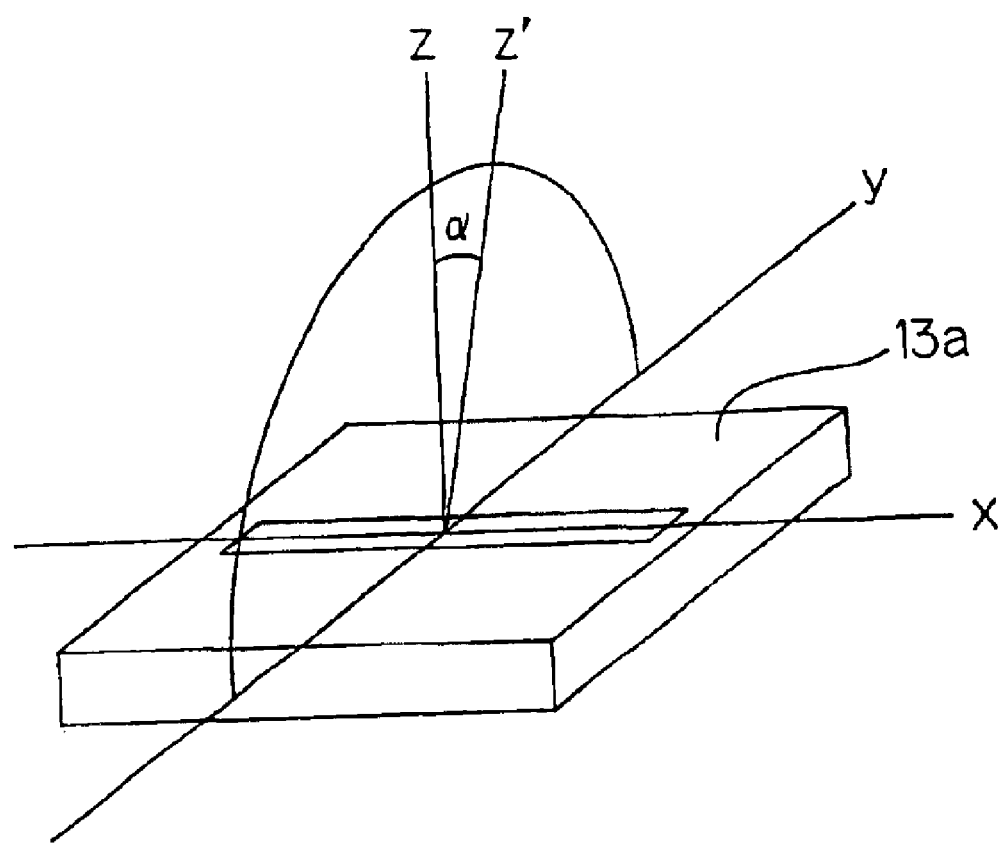

FIG. 7 is a front view showing an example pattern when the detecting surface 13a of the CCD detector 13 is divided into the direct light receiving region A and the likes of stray light receiving region B. The likes of stray light receiving region B is composed of segments B1 and B2 positioned respectively in the +y direction and −y direction with respect to the direct light receiving region A and segments B3 and B4 positioned respectively in the +x and −x directions with respect to the direct light receiving region A. The width WA of the direct light receiving region A is approximately 20-pixel wide, and a width WB of each of the likes of stray light receiving segments B1 through B4 is approximately 10-pixel wide. A space WC between the direct light receiving region A and each of the likes of stray light receiving segments B1 through B4 is approximately 10-pixel wide.

Signals from the region A and the segments B1 through B4 can be distinguished from each other by taking out charges generated on the detecting surface 13a of the CCD detector 13 successively by means of charge transfer, and digitally processing the same by an analog-to-digital converter to be handled by software.

The signal processing unit 2 (see FIG. 2) averages the signal intensities on the likes of stray light receiving segments B1 through B4, and subtracting the result from the signal intensity on the direct light receiving region A, whereby a net spectrum signal distribution excluding the adverse effects of the likes of stray light can be obtained.

The above description has described the preferred embodiment of the present invention. It should be appreciated, however, that the present invention is not limited to the above embodiment. For example, the above embodiment employs the flat focus type convex diffraction grating. However, the present invention is applicable to a multi-channel spectroscope, such as a Czerny-Turner type spectrophotometer using a planar diffraction grating and a toroidal mirror, an Ebert type spectroscope and its modified version, and a Littrow type spectroscope. Also, the signal intensities on the likes of stray light receiving segments B1 through B4 are averaged and the result is subtracted from the signal intensity on the direct light receiving region A in the processing discussed above. However, the signal intensities on the likes of stray light receiving segments B1 and B2 may be averaged and the result is subtracted from the signal intensity on the direct light receiving region A instead. Further, weights may be assigned at the time of averaging. Alternatively, the signal intensity on any of the likes of stray light receiving segments B1 through B4 alone may be subtracted from the signal intensity on the direct light receiving region A.

While preferred embodiments of the present invention have been described using specific terms, such description is for illustrative purposes, and it is to be understood that changes and variations may be made without departing from the spirit or scope of the following claims.

What is claimed is:

1. A spectrum measuring instrument including a dispersing element and a detector for detecting spectrum light coming out from said dispersing element, wherein:

said detector has a two-dimensional detecting surface having a first portion and a second portion; and the spectrum light coming out from said dispersing element is irradiated obliquely to said first portion on said detecting surface;

and further including:

a signal processing unit responsive to the output of the detector for obtaining a spectrum signal excluding adverse effects of stray light in which signal intensity at the second portion on said detecting surface is subtracted from signal intensity on said first portion;

a light transmitting window covering said detecting surface, and having a thickness and an inner surface; and said oblique irradiation of the spectrum light by the dispersing element being at an angle with respect to the normal of the detecting surface in a plane defined by the normal and a direction intersecting at right angles with a direction along which the one-dimensional spectrum extends so that spectrum light reflected by the detecting surface is reflected by the inner surface of the light transmitting window back to the detecting surface.

2. The spectrum measuring instrument according to claim 1, wherein said first portion on said detecting surface where the spectrum light is irradiated is an elongate rectangle.

3. The spectrum measuring instrument according to claim 2, wherein said second portion on said detecting surface (13a) used in obtaining the signal intensity for subtraction includes a plurality of segments located outside of a length of said rectangle.

4. The spectrum measuring instrument according to claim 2, wherein said second portion on said detecting surface used in obtaining the signal intensity for subtraction includes a plurality of segments located outside of a length and a width of said rectangle.

* * * * *